BUFFER WITH DELAY LINE RECIRCULATION

Filed Sept. 21, 1962 2 Sheets-Sheet 1

INVENTOR.
CARL M. LEKVEN
BY [signature]
ATTORNEY

United States Patent Office 3,257,645
Patented June 21, 1966

3,257,645

BUFFER WITH DELAY LINE RECIRCULATION

Carl M. Lekven, Burbank, Calif., assignor to General Precision, Inc., a corporation of Delaware Filed Sept. 21, 1962, Ser. No. 225,304
5 Claims. (Cl. 340—172.5)

Figure 1:
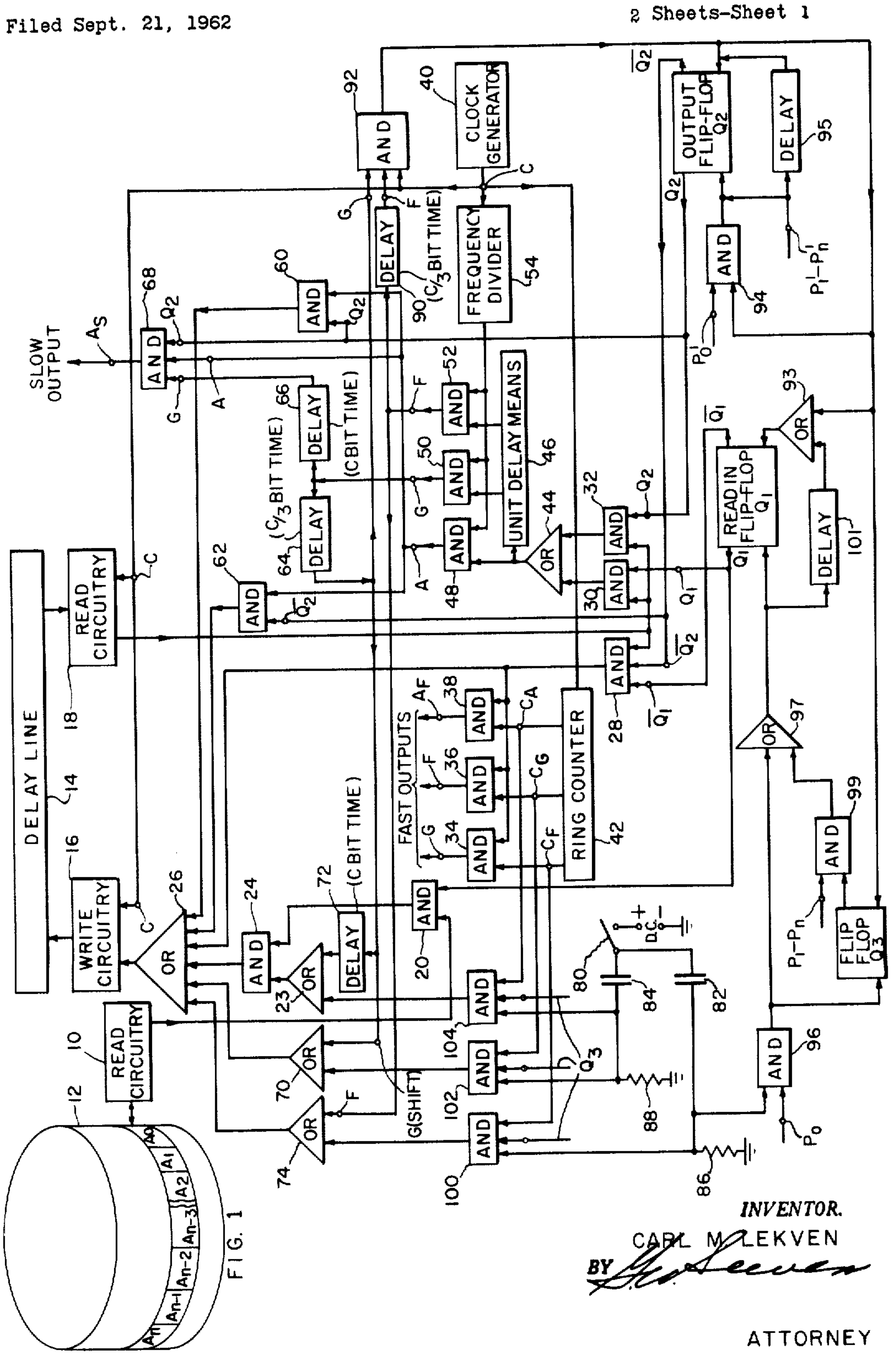

The present invention relates to electronic digital computers and the like, and it relates more particularly to an improved buffer system for use in electronic digital computers, data processors, and other electronic apparatus and systems.

Copending application Serial No. 203,985 filed June 20, 1962, discloses an improved electronic digital computer which is constructed to incorporate an arithmetic section in which all information is circulated in a serial interlaced manner through a single register.

As described in the copending application, the single circulating register of the computer described therein replaces the several registers required in the arithmetic section of the usual prior art computer.

The computer described in the copending application uses an ultrasonic delay line as the central component of the single interlaced circulating register in the arithmetic section. As noted in the copending case, recent advances in delay line technology have shown the feasibility of storing digital information directly in glass or fused quartz delay lines. These delay lines are presently available with delays from 20–150 microseconds, and with operating rates up to approximately 30 megabits per second. These characteristics permit extremely high circulating speeds for the information to be incorporated into the register.

The improved buffer system of the invention may also incorporate an ultrasonic delay line of the type described above. Also, the interlaced technique is used in that multi-digit binary control words and a multi-digit binary information word are stored together in a digit-interlaced relationship in a single serial circulating register, as will be described.

An important feature of the improved buffer system of the present invention is its flexibility. The capacity of the buffer to be described can be varied at will by a simple mechanical adjustment, this being accomplished without any need to alter the associated circuit or control components.

It is, accordingly, an object of the present invention to provide an improved buffer system which is relatively simple in its concept and which utilizes a minimum number of simplified components and relatively simple associated circuitry.

Another object of the invention is to provide such an improved system which is flexible in its concept in that it can be set to any desired capacity by means of a simple mechanical adjustment.

Another object of the invention is to provide a universal buffer system of the circulating type and which is capable of accepting inputs on demand from a synchronous or asynchronous source and of supplying outputs on demand to a synchronous or asynchronous utilization means.

Yet another object of the invention is to provide such a universal buffer system of the circulating type in which the stored information is circulated at a relatively high rate, but which is conceived and constructed so that information can be fed into the buffer system at a low asynchronous rate if so desired, and fed out of the buffer system, likewise, at a low asynchronous rate, if so desired.

It will be appreciated as the description proceeds that the improved buffer system of the invention has general utility whenever a simplified and economical buffer system is required. That is, the buffer system of the invention can be used, for example, to drive displays, hand sets, or to provide input/output buffering, and so on.

Figure 2:
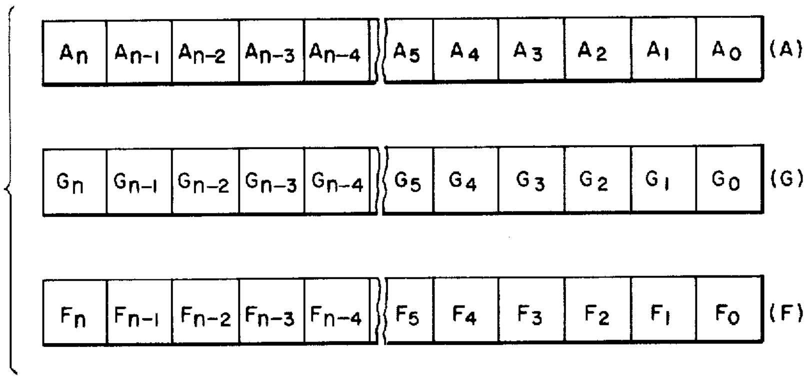
Figure 3:
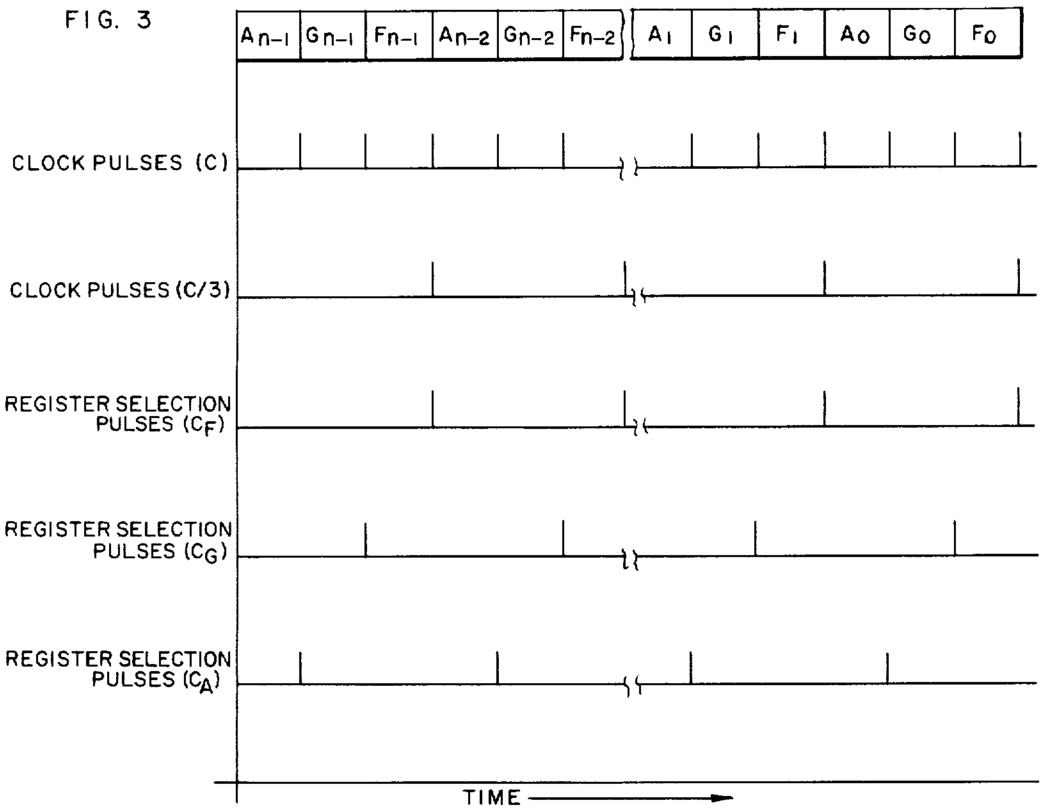

The features of the invention which are believed to be new are set forth in the claims. The invention itself, however, together with further objects and advantages thereof may best be understood by reference to the following description when taken in conjunction with the accompanying drawings, in which:

FIGURE 1 is a schematic block diagram of a buffer system constructed in accordance with the concepts of the present invention;

FIGURE 2 is a diagrammatic representation of certain multi-digit binary control words and a multi-digit binary information word, the words to be stored in digit-interlaced relationship in the buffer of the invention; and FIGURE 3 is a schematic representation of the interlaced information in the buffer of the invention, and also includes a timing chart of various control signals related to such information.

The buffer system illustrated in FIGURE 1 is shown as coupled to the read circuitry 10 associated with a particular channel of a magnetic memory drum 12. The particular channel on the drum 12 is represented as having a multi-digit binary information word thereon, with digits being represented as A1, A2, A3 . . . A$n$–3, A$n$–2, A$n$–1, A$n$.

The read circuitry 10 includes a usual electro-magnetic read head, so that the information on the particular track of the drum 12 is read as the drum rotates. The reading of the information from the drum proceeds at a relatively low rate, and in successive bit times represented, for example, as P0, P1 . . . P$n$–1, P$n$.

The system of FIGURE 1 is shown as receiving the information from the magnetic drum 12 and storing the information. This particular use for the buffer system of FIGURE 1 represents a particular application. The multi-bit binary information read from the drum and introduced into the buffer system at a relatively low rate is circulated at a high speed in the buffer system. The information may be read out of the buffer system of FIGURE 1 at the relatively high rate for application for example, to a high speed arithmetic section included in an associated computer. If so desired, however, the information may be read out of the buffer system at a relatively low speed for application to low speed utilization to low speed utilization networks and output devices.

The buffer system of FIGURE 1, of course, has general application, wherever a buffer is required between a source of signals and a utilization means. It is to be understood, therefore, that although the input for the buffer is illustrated in FIGURE 1 as derived from the magnetic memory drum 12, other appropriate input sources may be used.

The system of FIGURE 1 includes a delay line 14. This delay line, as mentioned above, may comprise an elongated rod of ground fused quartz, or fused silica, such as is presently manufactured by the Corning Electronics Division of the Corning Glass Company. Appropriate quartz crystals may be affixed to the respective ends of the rod forming the delay line 14 to function as electroacoustical transducers. Each of the transducers is bonded to the corresponding end of the rod, as is more fully described in the above-mentioned copending application.

Appropriate write circuitry represented by the block 16 is coupled to the electro-acoustical transducer at one end of the delay line 14, and appropriate read circuitry 18 is coupled to the electro-acoustical transducer at the other end of the delay line. It should be pointed out that the distance between the electro-acoustical transducers on the delay line 14 is dictated by the amount of information to be stored in the buffer system. This amount can be changed, therefore, by a simple adjustment of the spacing between the transducers, or by the simple addition of additional delay means in the system because all internal control signals are dependent only upon the delay in the system. Therefore, the buffer system of FIGURE 1 is extremely flexible in that it can be tailored to a wide variety of applications and loads, without the need to change any of the components or circuitry associated with the delay line 14.

The read circuitry 10 applies the information read from the track on the drum 12 to an "and" gate 20. A read-in flip-flop Q1 is provided, and the reset output terminal of the flip-flop Q1 is also connected to the "and" gate 20.

The and gate 20 is connected to one terminal of an and gate 24. The and gate 24 is connected to a terminal of an "or" gate 26 which is coupled to the write circuitry 16.

The read circuitry 18 has its output terminal connected to a group of and gates 28, 30 and 32. The system also includes an output flip-flop Q2. The set output terminal of that flip-flop is connected to the and gate 32, whereas the reset output terminal of the output flip-flop is connected to the and gate 28. The reset output terminal of the read-in flip-flop Q1 is also connected to the and gate 28, and the set output terminal of the read-in flip-flop is connected to the and gate 30. The output terminal of the and gate 28 is connected to the or gate 26, and to a plurality of and gates 34, 36 and 38.

The system includes a clock generator 40. This generator may incorporate any appropriate oscillator circuit and it develops clock pulses designated C, which recur at a precisely controlled repetition frequency. The clock pulses C are introduced to the read circuitry 18 and to the write circuitry 16 to clock the information in the delay line 14. The clock pulses C are also applied to a ring counter 42 which, in turn, generates a series of register control signals $C_A$, $C_G$ and $C_F$ which occur at successive C/3 clock times. These control signals are applied respectively to the and gates 38, 36 and 34.

The and gates 30 and 32 are connected to an or gate 44 which, in turn, is connected to a unit delay means 46. The unit delay means may be formed of tapped delay lines, or it may be formed of a series of flip-flops. In either event, each tap on the unit delay means, or each flip-flop therein, provides a delay corresponding to one bit time, as clocked by the clock pulses C from the clock generator 40.

The or gate 44 is also connected to an and gate 48, whereas a first tap on the unit delay means 46 is connected to an and gate 50, and a second tap on the unit delay means is connected to an and gate 52. The clock pulses C from the clock generator 40 are applied to a 3:1 frequency divider 54 which provides sub/multiple clock pulses C/3 which recur at one-third the repetition frequency of the clock pulses C. The sub/multiple clock pulses C/3 are applied to the and gates 48, 50 and 52.

The and gate 48 is connected to an and gate 60 and to a further and gate 62. The set output terminal of the flip-flop Q2 is connected to the and gate 60, and the reset output terminal of the output flip-flop Q2 is connected to the and gate 62. The and gate 60 is connected to the or gate 26, and the and gate 62 is connected to the or gate 26.

The and gate 50 is connected to a delay line 64 and to a delay line 66. The delay line 64 imparts a time delay to the signal from the and gate 50 corresponding to a C/3 bit time, and the and gate 66 imparts a time delay to the signal corresponding to the C bit time.

The delay line 66 is connected to an and gate 68, and the and gate 48 is also connected to the and gate 68, as is the set output terminal of the output flip-flop Q2. The and gate 68 is connected to an output terminal designated $A_S$, at which the slow output of the buffer system appears.

As will be described, the buffer system may be conditioned to an output mode during which successive digits of the stored multi-digit binary word are supplied to the output terminal $A_S$ at a rate at which each successive digit appears at the output terminal $A_S$ at times corresponding to each circulation of the information through the delay line 14, or as demanded by the output device, if slower than the recirculation rate of delay line 14, as will be described.

The delay line 64 is connected to an or gate 70 and to a delay line 72. The delay line 72 imparts a time delay to the signal from the delay line 64 corresponding to a C bit time. The delay line 72 is connected through an or gate 23 to the and gate 24. The and gate 52 is connected to an or gate 74. The or gates 70 and 74 are each connected to the or gate 26.

The buffer system of FIGURE 1 includes a start switch 80. One of the terminals of the switch 80 is connected to the positive terminal of a direct current voltage source, the negative terminal of which is grounded. The other terminal of the switch 80 is connected to a capacitor 82 and to a capacitor 84. The capacitor 82 is connected to a grounded resistor 86 and to an and gate 100. The and gate 100 is connected to an or gate 74. The capacitor 84 is connected to a grounded resistor 88 and to an and gate 102. The and gate 102 is connected to the or gate 70.

The and gate 52 is also connected to a delay line 90. The delay line 90 imparts a time delay corresponding to a C/3 bit time to the signal from the and gate 52.

The delay line 90 is connected to an and gate 92 which, in turn, is connected through an or gate 93 to the reset input terminal of the read-in flip-flop Q1 and to the reset input terminal of the output flip-flop Q2. The and gate 92 is also connected to an and gate 94 which, in turn, is connected to the set input terminal of the output flip-flop Q2. An output bit timing signal P0′ from an associated computer, or the like, is also applied to the and gate 94, this latter signal being used to set the buffer system to its output mode, and so that the first output bit may be read into the associated system. The bit timing signals **P1′–P*n*′ from the associated system are also applied to the set input terminal of the flip-flop Q2, and through a delay line 95** to the reset terminal thereof.

The resistor 86 is also connected to an and gate 96 which, in turn, is connected through an or gate 97 to the set input terminal of the read-in flip-flop Q1. A bit timing signal $P_0$ from the system associated with the magnetic memory drum 12 is also applied to the and gate 96.

An and gate 99 is also connected to the or gate 97. The bit timing signals $P_1$–$P_n$ of the associated system are applied to the and gate 99. The or gate 97 is connected throught a delay line 101 to the or gate 93. The and gate 96 is also connected to the set input terminal of a flip-flop Q3. The set output terminal of the flip-flop Q3 is connected to the and gate 99. The and gate 92 is also connected to the reset input terminal of the flip-flop Q3.

The resistor 88 is also connected to an and gate 104 which, in turn, is connected to the or gate 23. The ring counter 42 applies the signal $C_A$ to the and gate 104. The term $Q_3$ is applied to each of the and gates 100, 102 and 104. This term, as applied to the and gates 100, 102 and 104 causes the bits in the buffer to be inserted at P0 bit time, so as to be properly timed with succeeding A bits from the memory 12. Some means may also be provided to disable the and gates 102 and 104 until after the and gate 100 has passed the first unity F bit ($F_0$) so that the words may be interlaced in the desired sequence, as shown in FIGURE 3.

The buffer system of FIGURE 1 has three distinct operating modes. These are an input mode, a circulate mode and an output mode. When the system is in the input mode, the read-in flip-flop Q1 is set, so that information, for example, from the read circuitry 10 may be input into the buffer system. When the buffer system is in its circulate mode, the information fed to the system during the input mode is recirculated through the delay line 14 at a relatively high speed until needed. When the system is in its circulate mode, a serial "fast" output of the circulating information is provided at an output terminal $A_F$ connected to the and gate 38, and corresponding control data appears serially at the output terminals F and G respectively connected to the and gates 36 and 34.

For the output mode of operation of the system, the output flip-flop Q2 is set. This enables the circulating information word to appear serially at the output terminal $A_S$, as mentioned above.

In the system illustrated in FIGURE 1, three separate multi-bit binary words are stored in the system during the circulate mode. These words, as illustrated in FIGURE 2, include a multi-bit information word which is derived, for example, from the magnetic memory drum 12. The multi-bit information word is considered to having binary digits A0, A1, A2 . . . A*n*–2, A*n*–1, A*n*.

In addition the multi-bit information word, a pair of multi-bit control words designated G and F are also stored in the buffer system. The multi-bit control word G is considered to have binary digits $G_0, G_1, G_2 \ldots G_{n-1} G_n$; whereas the multi-bit control word F is considered to have binary digits $F_0, F_1, F_2 \ldots F_{n-1}, F_n$.

As best shown in FIGURE 3, the two multi-bit control words and the multi-bit information word are circulated in the system of FIGURE 1 in a bit-interlaced relationship. The successive bits of the composite interlaced data circulating in the buffer system occur at successive C bit times, as timed by the clock pulses C. The successive bits of each individual word, on the other hand, occur at bit times C/3, as timed by the sub-multiple clock pulses C/3.

As will be described, the multi-bit binary control signal F has a unit binary digit at the $F_0$ bit position, and all the remaining binary digits of that control word are zero. Likewise, the multi-bit binary control signal G initially has a unit binary bit at the $G_0$ bit position, and all the other digits of the G control word are binary zero. The F control word is circulated without shift through the system during the input, circulate and output modes. However, the G control signal shifts a C/3 bit position for each circulation during the input and output modes. This causes the unit digit of the G control word to assume the $G_1, G_2, G_3 \ldots$ bit positions for each successive circulation of the word. The relationship between the two control words F and G is used to control the inputting and outputting of the information into and out of the buffer system of FIGURE 1.

To set the buffer system of FIGURE 1 to its input mode, the start switch 80 is closed momentarily so as to connect the capacitors 82 and 84 across the direct current source. The resulting charging current flow into these capacitors provides a pair of sharp signals which are applied to the and gates 100 and 102 respectively.

As shown in FIGURE 3, the ring counter 42 develops register selection pulses $C_A$, $C_G$ and $C_F$. These pulses occur in time coincidence with the bit times of the different words in the system. Therefore, the register selection pulses $C_F$ occur in time coincidence with the bits of the F control word, the register selection pulses $C_G$ occur in time coincidence with the bits of the G control word, and the register selection pulses $C_A$ occur in time coincidence with the bits of the A information word.

The and gate 100 is enabled at an F bit time by a selection pulse $C_F$, so that the resulting signal across the capacitor 82 is introduced through the or gates 74 and 26, and through the write circuitry 16 into the delay line 14 at an F bit time, which shall be referenced as the $F_0$ bit. Likewise, the and gate 102 is enabled at the next adjacent G bit time by a $C_G$ pulse, so that the signal across the capacitor 84 is inserted into the delay line 14 at the adjacent $G_0$ bit time.

Therefore, at the outset, and considering that the system is initially cleared to a condition corresponding to binary zeros, the $F_0$ digit of the F control word is set to one, and the $G_0$ digit of the G control word is also set to one.

The signal developed across the capacitor 82 when the start switch 80 is momentarily closed is also applied to the and gate 96. Then, the next $P_0$ bit time in the system of the magnetic memory drum 12 sets the read-in flip-flop Q1. This bit time corresponds to the beginning of the information word on the drum 12, and each successive digit of that word is read by the read circuitry 10.

So long as the read-in flip-flop Q1 is in its set condition, the and gate 20 is enabled, so that the information from the read circuitry 10 is passed through the and gate and into the buffer system. It will be understood that the successive reading of the digits A0, A1, A2, A3 . . . $A_n$ by the read circuitry 10, at the corresponding P0, P1, P2 . . . P*n* bit times, proceeds at a much slower rate than the circulation in the buffer system of FIGURE 1. Therefore, the system of the invention is conceived so that the input control is such that each successive digit from the read circuitry 10 is read into the buffer system during complete circulation of the buffer system.

For example, the digit $A_0$ is read into the system at the $A_0$ bit position in FIGURE 3 because the and gate 104 is enabled by the $C_A$ signal at the proper time to enable the and gate 24, so as to permit the $A_0$ digit to pass from the and gate 20 through the and gate 24 and the or gate 26 and write circuitry 16 into the $A_0$ position in the delay line 14.

The delay line 101 has a time delay such that the bit timing pulse $P_0$ resets the flip-flop Q1 at the end of a circulation time for the buffer system, so that the buffer returns to its circulate mode.

The buffer remains in its circulate mode until the next bit timing pulse P1 returns it to the input mode. The buffer remains in the input mode for one complete circulation to permit the $A_1$ bit to be read into the buffer in its proper position. The flip-flop Q1 is then again reset, this time by the delay bit timing pulse P1, and the buffer is again returned to its circulate mode.

The above-described action is continued, under the control of the P2, P3 . . . P*n* bit timing pulses, until all the bits of the information on the track of the drum 12 are read into the buffer system of the invention. When this occurs, the unit bits of the F and G information occur in time coincidence at the and gate 92, so that the flip-flop Q1 is reset and the buffer is conditioned to its circulate mode.

The flip-flop Q3 is included to render the buffer system unresponsive to the bit timing pulses P0–P*n*, until the start switch 80 has been actuated. This actuation enables the P0 bit timing pulse to set the flip-flop Q3 and so enable the and gate 99 and permit it to pass the P1–P*n* bit timing pulses.

The information written into the delay line 14 circulates down the delay line and is read by the read circuitry 18. During the input mode, the flip-flop Q1 is in its set condition, so that the and gate 30 is enabled, and the and gate 28 is disabled. Therefore, the information from the read circuitry 18 passes through the or gate 44 to the unit delay means 46.

The unit delay means 46 operates in a manner similar to the ring counter 42 to cause the separate multi-digit words, interlaced in the delay line 14, to be separated and selected. In this manner, the successive digits of the multi-bit information word A appear at successive C/3 bit times at the output of the and gate 48; the successive digits of the multi-bit G control word appear at successive C/3 bit times at the output of the and gate 50; and the successive digits of them multi-bit F control word appear at successive bit times at the output of the and gate 52.

The bits of the multi-bit F control word from the and gate 52 are circulated through the or gate 74, and through the or gate 26, to be written back into the delay line 14 without timing change. Therefore, the F control word circulates through the system with the unit digit remaining at the $F_0$ bit position. The G word, on the other hand, derived from the and gate 50 is delayed C/3 bit time by the delay line 64, before being circulated through the or gates 70 and 26 back to the delay line 14.

Therefore, during the "input" mode, the unit bit of the multi-bit G control word shifts successively to the $G_1$, $G_2$, $G_3$ . . . bit positions for each successive circulation of the G control word. The end of the first circulation is indicated by the unit bit of the G control word, and this bit is applied through the delay line 72 and or gate 23 to the and gate 24. The unit G bit enables the and gate 24, so that it will pass the next information word digit $A_1$ to the delay line 14. The G unit bit is delayed by a C bit time by the delay line 72 to occur at A1 bit time, so that the and gate 24 will be enabled at the proper time during the input mode for the A1 bit of the information word to be read from the drum 12 into the delay line 14.

As pointed out, the serial reading of the multi-bit information word A by the read circuitry 10, and its associated read head, proceeds at such as low speed relative to the circulation of the system of FIGURE 1, that each successive digit of the A word on the drum 12 is read during a complete circulation of the buffer system.

At the end of the next circulation of the buffer system during the input mode, the unit bit of the G control word shifts to the G2 bit position, and it is delayed to the A2 bit position by the delay line 72, so that the and gate 24 is enabled to receive the A2 bit of the information word. In this manner, each successive bit of the multi-bit information word A is read into the buffer system, with each bit being selected at a slow speed corresponding to the speed of reading of the successive bits from the memory 12, by waiting for a complete circulation in the buffer system between the acceptance of each successive bit of the input information.

This serial acceptance by the buffer system of the successive bits of the information word A continues until all the bits have been read into the buffer system. This latter condition is indicated, as mentioned, when the unit bits of the control words F and G again assume their adjacent positions in the system, again corresponding to the $F_0$ and $G_0$ bit times.

When the latter condition occurs, the and gate 92 is enabled. The F bit is delayed by one C/3 bit time by the delay line 90, so that when the $G_0$ bit is again a unit bit, the $F_0$ unit bit will occur in time coincidence with it, so as to reset the flip-flops Q1 and Q3.

When the read-in flip-flop Q1 is reset, the and gate 22 is immediately disabled, so as to cause the system to be in its circulate mode. When the flip-flop Q1 is reset, the and gate 28 is enabled, so that the information from the read circuitry 18 circulates through the and gate 28 and through the or gate 26 back to the write circuitry 16.

Therefore, during the circulate mode, the interlaced information and control words in the buffer system of FIGURE 1 recirculate through the system at the relatively high C clock speed, and there is no shift of the unit G bit. During this recirculation of the information, the register selection signals $C_A$, $C_G$ and $C_F$ generated by the ring counter 42 selectively enable the and gates 34, 36 and 38, so that the information signal A appears at successive C/3 bit times at the output of the and gate 36; and the control word G appears at successive C/3 bit times at the output of the and gate 34.

The fast output appearing at the terminal $A_F$ at the output of the and gate 38 during the recirculating mode of the buffer system, may be used, for example, when it is desired to feed information directly into a corresponding high speed system. The corresponding high speed system may, for example, be an arithmetic section using the recirculating interlaced delay line concept, as described in the copending application.

On the other hand, it may be desired to feed the information from the buffer system of FIGURE 1 at a relatively low speed, corresponding to the low speed at which the information was input into the system. The slow speed output is derived by setting the flip-flop Q2, which sets the buffer system to the output mode. This occurs in response to a bit timing pulse P0′ applied to the and gate 94 and derived, as mentioned, from an associated computer, or the like.

When such a bit timing pulse P0′ is supplied to the and gate 94, the next time the and gate 92 is enabled, to indicate an $F_0$ bit time, the clock pulses C are passed by the and gate 92 and by the and gate 94 to set the output flip-flop Q2. This enables the and gates 60 and 32, and disables the and gate 28.

Therefore, when the buffer system is set to the output mode, the information in the delay line can no longer recirculate through the and gate 28, but must pass through the and gate 32 and through the unit delay means 46. As before, the successive digits of the individual words are serially selected by the and gates 48, 50 and 52. The successive digits of the information word A are recirculated through the and gate 60 and through the or gate 26 back to the write circuitry 16, so that during the slow output phase, the information word recirculates with unchanged timing through the system, and is not destroyed.

The successive bits of the multi-bit G control word circulate through the delay line 64 and through the or gate 70 and or gate 26 back to the write circuitry 16. Therefore, as in the input mode, the unit digit of the multi-bit G control word shifts from one bit position to the next for each circulation during the output phase.

It will be appreciated that during the circulate mode of the buffer system, there was no shift in the unit digit of the G control word, because all the contents of the delay line 14 circulated serially through the and gate 28. During the slow output mode, the set condition of the flip-flop Q2 also disables the and gate 62, so that the bits of the multi-bit information word A can no longer circulate through the and gate 62.

The successive bits of the multi-bit G word are also passed through the delay line 66 to the and gate 68. The bits of the information word A are also passed to the and gate 68. The delay line 66 delays the digits of the G control word by a C bit time, so that the unit bit of the G word occurs in time coincidence with the adjacent A bit, for each successive circulation in the system.

The and gate 68 is enabled by the set condition of the flip-flop Q2, so that for each circulation during the output mode, a different successive bit of the information word A appears at the output terminal $A_S$. The output mode is controlled by the bit timing pulses P0′–P$n$′, with the buffer returning to the circulate mode for the interval between each successive one of these pulses. This control is by virtue of the delay line 95.

Therefore, the bits of the information word A appear successively at the output of the and gate 68, but at a relatively slow rate, with each successive bit of the information word appearing at the completion of each circulation of information through the system during the output mode thereof. During the slow output mode, the bits of the F control word circulate, as in the input mode, through the or gates 74 and through the or gate 26.

The slow output phase of the buffer system continues until the unit digits of the G and F control words again appear adjacent one another, so as to indicate that all the digits of the information word have been read out through the and gate 68. When this condition occurs, the and gate 92 again is enabled, so that the next succeeding clock pulse C is applied to the reset input terminal of the output flip-flop Q2 to reset the output flip-flop. This returns the buffer system to its circulate phase, and the information is again recirculated as it was before the slow output phase was initiated.

The invention provides, therefore, an improved circulating buffer system which uses solid state components, and which does not require any moving parts. The improved buffer system of the invention is advantageous in that it is flexible in its characteristics, as it can be set to receive any desired quantity of information, by means of simple mechanical adjustments. Moreover, the improved buffer system of the invention is advantageous in that it operates at a relatively high speed, and yet is capable of inputting or outputting information at a relatively low speed.

While a particular embodiment of the invention has been shown and described, modifications may be made, and it is intended in the claims to cover all such modifications as fall within the scope of the invention.

What is claimed is:

1. An electrical buffer circuit including: recirculating delay means for carrying bits of binary data in a series of successive bit positions, said binary data including a multi-bit binary information word and first and second multi-bit binary control words carried in said delay means in a bit-interlaced relationship with one another; circulating circuitry coupled to said delay means for causing the interlaced binary words to be circulated through said delay means at successive bit times; first logic circuitry coupled to said delay means for causing said first multi-bit control word to have a predetermined pattern of unit and zero binary bits; second logic circuitry coupled to said delay means for causing said second multi-bit control word to have a predetermined pattern of unit and zero binary bits; network means included in said circulating circuitry for causing the timing of said first control word to change relative to said second control word for each circulation thereof through said delay means; and circuit means coupled to said delay means for passing successive bits of said information word in response to the control exerted by said first and second control words.

2. The buffer circuit defined in claim 1 in which said first and second multi-bit control words in said delay means each includes a single binary bit of one value and remaining binary bits of a second value.

3. The buffer circuit defined in claim 1 in which said each of said first and second control words is composed of a unit binary bit and of a plurality of zero binary bits, and in which the control exerted on said last named circuit means to cause the same to pass each successive bit of said information word occurs at a predetermined time relationship between the unit bits of said first and second control words.

4. The buffer circuit defined in claim 1 in which said first control word is composed of a single unit binary bit and remaining zero binary bits, and said second control word has a single unit bit initially disposed adjacent the unit bit of said first control word and having remaining zero binary bits.

5. The buffer circuit defined in claim 2 in which said network means includes means for causing the bits of said one value of said first control word to shift a predetermined number of bit positions for each circulation of said first control word through said delay means, and in which said circuit means passes successive bits of said information word in response to a predetermined time relationship between said bits of said one value of said first and second control words for each circulation thereof through said delay means.

References Cited by the Examiner

UNITED STATES PATENTS

| | | | |
|---|---|---|---|
| 2,905,930 | 9/1959 | Golden | 340—174 |
| 2,947,478 | 8/1960 | Lentz et al. | 235—160 |
| 2,974,867 | 3/1961 | Steele | 235—167 |
| 3,107,344 | 10/1963 | Baker et al. | 340—173 |
| 3,133,190 | 5/1964 | Eckert et al. | 235—159 |

ROBERT C. BAILEY, *Primary Examiner.*

I. S. KAVRUKOV, *Assistant Examiner.*